United States Patent [19]

Gray et al.

[11] Patent Number: 5,538,280
[45] Date of Patent: Jul. 23, 1996

[54] ANTI-RAVEL AIRBAG FABRIC REINFORCEMENT

[75] Inventors: Keith N. Gray, Greensboro; Earl T. Crouch, High Point; Michael D. Bertolucci, Greensboro, all of N.C.

[73] Assignee: Highland Industries, Inc., Greensboro, N.C.

[21] Appl. No.: 316,124

[22] Filed: Sep. 30, 1994

[51] Int. Cl.[6] ............................ B60R 21/16; B29D 31/00
[52] U.S. Cl. ............................ 280/743.1; 428/35.2
[58] Field of Search .......................... 280/728 R, 743 R, 280/729, 738, 739, 730 R, 732, 728.1, 743.1; 427/491, 501, 503, 513, 515; 8/115.52, 115.53; 428/35.2, 35.7

[56] References Cited

U.S. PATENT DOCUMENTS

| | | | |
|---|---|---|---|
| 3,807,754 | 4/1974 | Rodenbach et al. | 280/150 |
| 3,991,249 | 11/1976 | Yamashita et al. | 428/257 |
| 4,198,465 | 4/1980 | Moore et al. | 428/911 |
| 4,549,880 | 10/1985 | Hendrix et al. | 8/115.52 |
| 4,911,471 | 3/1990 | Hirabayshi | 280/732 |
| 4,921,735 | 5/1990 | Bloch | 428/34.9 |
| 4,934,734 | 6/1990 | Takada | 280/731 |
| 4,966,389 | 10/1990 | Takada | 280/743 |
| 5,046,759 | 9/1991 | Enniss | 280/743 R |
| 5,071,161 | 12/1991 | Mahon et al. | 280/739 |
| 5,085,917 | 2/1992 | Hodnett, III | 427/513 |
| 5,100,168 | 3/1992 | Horiuchi et al. | 280/728 |
| 5,110,666 | 5/1992 | Menzel et al. | 280/728 R |
| 5,114,180 | 5/1992 | Kami et al. | 280/739 |
| 5,126,189 | 6/1992 | Tanny et al. | 428/220 |
| 5,208,097 | 5/1993 | Honma et al. | 280/743 R |
| 5,215,795 | 6/1993 | Matsumoto | 280/743 R |
| 5,258,211 | 11/1993 | Momii et al. | 280/743 R |
| 5,280,952 | 1/1994 | Hirabayashi et al. | 280/739 |

FOREIGN PATENT DOCUMENTS

| | | | |
|---|---|---|---|
| 0496894 | 8/1992 | European Pat. Off. | |
| 2-237837 | 9/1990 | Japan | 280/743.1 |
| 2-299952A | 12/1990 | Japan | |
| 4-56652 | 2/1992 | Japan | 280/743 R |
| 5-238340 | 9/1993 | Japan | 280/743 R |
| 2252983 | 8/1992 | United Kingdom | |
| WO90/01436 | 2/1990 | WIPO | |
| WO91/18760 | 12/1991 | WIPO | |

OTHER PUBLICATIONS

W. K. Walsh and B. S. Gupta, "Solventless Fabric Coating by Radiation Curing; Part I: Background and Potential," Journal of Coated Fabrics, vol. 7 (Apr. 1978), pp. 253–262.

Primary Examiner—Karin L. Tyson
Attorney, Agent, or Firm—Rhodes, Coats & Bennett

[57] ABSTRACT

A process of reinforcing airbag fabric edges to prevent raveling or fraying of the fabric during the cutting process. The process is carried out by coating the yarn crossovers with a flexible, thin film of a radiation polymerizable resin and then curing the coating system at high production speeds. The airbag fabric is cut in those areas where the coating has been applied and cured, thereby providing a band or border of cured resin of sufficient width to prevent raveling of the airbag fabric edge. The process is particularly suitable for the fabrication of airbags used for the protection of vehicle occupants as in automobiles. Airbags constructed of a breathable, edge-coated fabric are also described.

18 Claims, 4 Drawing Sheets 5,538,280

1

ANTI-RAVEL AIRBAG FABRIC REINFORCEMENT

FIELD OF THE INVENTION

The present invention relates to a process of reinforcing airbag fabric. More specifically, the present invention relates to a process of coating an airbag fabric edge to prevent raveling or fraying.

BACKGROUND OF THE INVENTION

Woven fabrics that are made from thermoplastic yarns tend to disassemble along the cut edge, when cut into pieces or shapes and subsequently handled during various assembly operations. This disassembly occurs as the result of the untangling of the warp and weft yarns, and is commonly known as raveling.

Raveling significantly reduces the efficiency of subsequent article fabrication operations such as sewing, and seriously reduces the strength of the fabric at its edges. Articles fabricated from fabrics with edges having untangled warp and weft yarns tend to pull apart when sewn together and stressed. This phenomenon is generally referred to as combout. When this deficiency, particularly in strength, occurs in airbags which become inflated by high speed expansion with a hot gas, unacceptable leakage of gas occurs at the sewn seams and could potentially result in burn injuries to persons in close proximity to the inflated airbag.

Various physical procedures have been proposed and adopted to prevent edge raveling. These include fusing the warp and weft yarns along the cut edge by various means during the cutting process. Processes known to be commonly used in this regard are based on hot-die and laser cutting methods. Generally, these methods are limited to cutting one to ten layers of fabric at a time, thus adding significant costs to the production of the finished articles such as automotive airbags.

Airbags typically used in restraint systems in automobiles and other vehicles must satisfy a number of unique and demanding requirements. For example, airbags must have the ability to inflate fully in milliseconds, absorb the impact of the passenger, yet deflate rapidly to provide pneumatic dampening, thus preventing the passenger from being repelled in a rearward direction. Fabrics that are useful for airbag construction are required to be strong, lightweight, packable or foldable into a confined area, and resistant to abrasion.

Typically, conventional airbags meeting the above objectives are made of coated fabrics like neoprene-coated nylons. However, some airbag designs, particularly those intended for passenger side application, may use uncoated fabrics except for those areas which may require reinforcement, such as perimeter seams. The technology described herein is ideally suited to these applications. These otherwise uncoated airbags may optionally contain vent holes to deflate, or preferably rely on the inflating gases escaping through porous, low permeability, non-coated panels such as those described by Block in U.S. Pat. No. 4,921,785. Some of the advantages of the latter option include lower cost, lighter weight, and enhanced packability. The designs using essentially non-coated and low permeability panels require fabric edge reinforcement to allow efficient airbag construction and acceptable inflation performance.

SUMMARY OF THE INVENTION

The present invention is directed to a process of reinforcing airbag fabric edges to prevent raveling or fraying of the yarns during the cutting process. To this end, the process is carried out by coating the yarn crossovers with a flexible, thin film of a radiation polymerized resin and then curing the coating system at high production speeds. The airbag fabric is then cut in those areas where the cured coating is applied, thereby providing a band or border of cured resin of sufficient width to prevent raveling of the fabric edge. The airbag fabric can be coated before cutting or immediately after cutting the fabric before the fabric unravels. Airbag fabrics treated by the process of the present invention have a significantly reduced tendency to ravel during cutting, handling, and assembly. Further, airbag fabrics that are reinforced by the process produce better end results as compared to unreinforced airbag fabrics. The airbags are made of essentially uncoated, breathable fabrics such as nylon, polyester and polyolefin.

Additional features and advantages of the present invention are further described, and will be apparent from the detailed description from the presently preferred embodiments.

BRIEF DESCRIPTION OF THE DRAWINGS

The invention is illustrated with reference to the appended drawings in which.

DETAILED DESCRIPTION OF THE PREFERRED EMBODIMENTS

Figure 1:
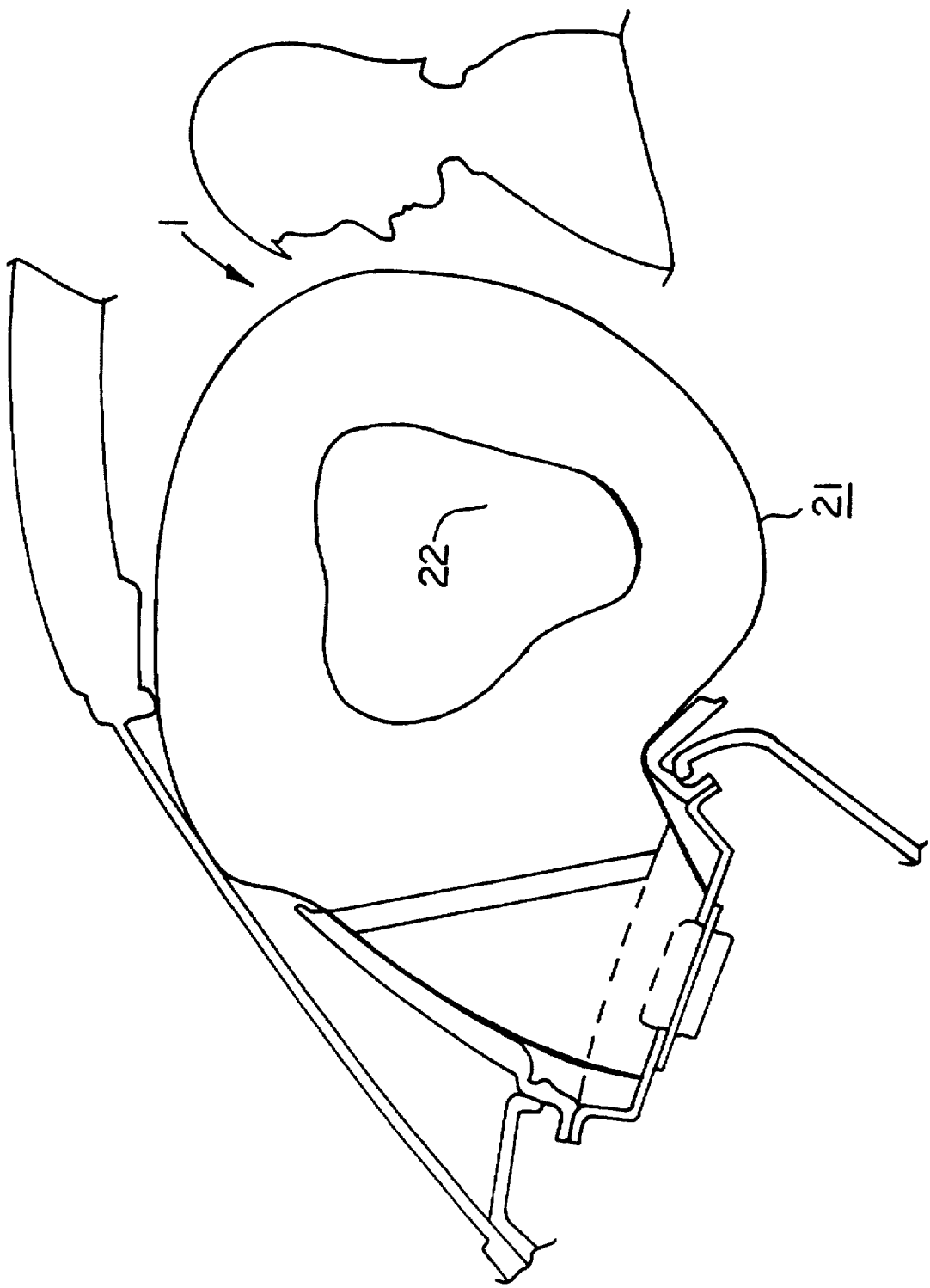
FIG. 1 illustrates a schematic side view of a passenger side airbag in the inflated position.

The inventors have found that coating compositions containing an initiator, polyfunctional acrylic monomers, acrylated urethane, oligomers and polymers in combination with other additives, produce crosslinked radiation curable coatings which are highly effective in enhancing the ravel resistance of cut airbag fabric edges without the shortcomings associated with the above-mentioned prior art.

In practicing the present invention, the radiation curable coating compositions are first compounded by adding together the polyfunctional acrylic monomer or mixtures thereof, optionally an ultraviolet (UV) sensitizer, and optionally, any other additives. The various components are thoroughly mixed so as to form a generally homogeneous coating composition. A thin, uniform coating of the coating solution is then applied onto the airbag fabric surface by any of the known means such as dipping, spraying, screen printing, rollcoating and the like. In the instant invention, a screen application is preferred. The coating is then cured (optionally in an inert, e.g., [nitrogen] atmosphere) using ultraviolet or, optionally, electron beam radiation. Preferably, UV radiation which can have a wavelength of from 1000 A. to 3900 A. is the most cost effective.

In the present invention, the lamp systems used to generate such radiation can consist of ultraviolet lamps which can include discharge lamps, i.e., xenon, metallic halide, metallic arc, or mercury vapor discharge lamp, etc., having operating pressures of from as low as a few milli-torr up to about 10 atmospheres. Curing by exposure to an electron beam is also possible. The electron source may be gamma or pile sources, or electrostatic methods. For purposes of the present invention, curing is defined as the copolymerization of the polyfunctional acrylic monomers, acrylated urethane oligomers and polymers to form a flexible coating.

The reaction chemistry of crosslinking through radiation induced polymerizations of, for example, UV-curable coatings, is generally known to those skilled in the art.

In the practice of this invention, the UV curable coating is generally formed by, but is not restricted to, the polymerization of acrylated urethane oligomers.

The principle components of the embodied coating materials for this application are of two main types. These are:
1. Resins. These may be oligomers or prepolymers.
2. Diluents. These may be:
   a. reactive monomers or oligomers.
   b. unreactive compounds that plasticize the cured film.

Preferred materials should give a hard but flexible coating with good adhesion to various fabric substrates. The coating must have acceptable wetting and flow characteristics to provide for uniform application to the airbag fabric.

Resin types generally used include:
Unsaturated Polyesters
Acrylated Polyesters
Acrylated Epoxy Esters
Acrylated Isocyanates
Acrylated Triazines
Acrylated Polyethers
Thiol-ene Systems:
  Cationic cured epoxy systems
  Aminoplasts cured by photoliberated acids A preferred aspect of the invention is the use of acrylated polyurethane resin materials and reactive oligomers.

Urethane resins may be prepared as follows from reactions of isocyanates with compounds containing hydroxyl groups such as alcohols:

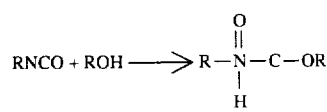

Unsaturation may then be readily introduced when R is acrylic, allylic, vinylic, et al. For example:

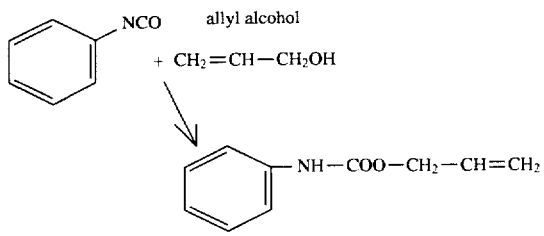

More complicated urethanes may be prepared by reacting:

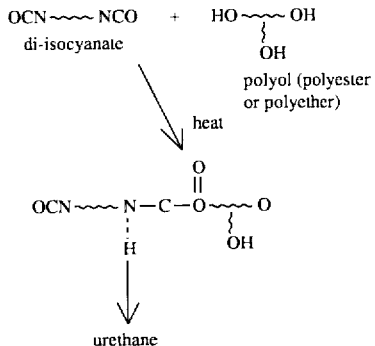

Unsaturation may also be introduced by reacting a hydroxyl-modified acrylic or methacrylic monomer with a polyisocyanate to obtain a urethane-type resin containing acrylic linkages which can then undergo free-radical photopolymerization.

Di-isocyanates are frequently used, allowing large structures to be formed, especially when the chain is lengthened by ethylene oxide derivatives, amino alcohols, polyesters, diamines, etc. as shown below.

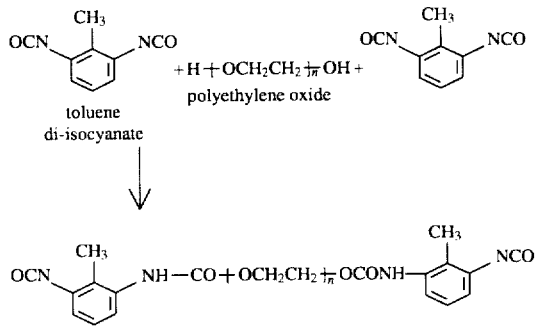

Very large complicated urethane structures may be built up by combinations with acrylics and polyester/urethane complexes, e.g., a polyester/acrylate may be based upon adipic acid (AD) and hexanediol (HD) reacted through its terminal hydroxyl groups with acrylic acid to give a structure of the form:

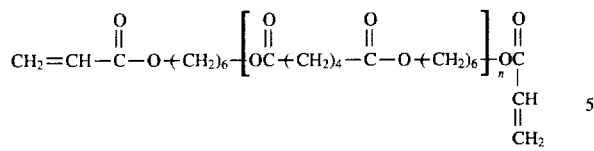

and this same polyester acrylate may then be reacted with toluene-di-isocyanate (TDI),

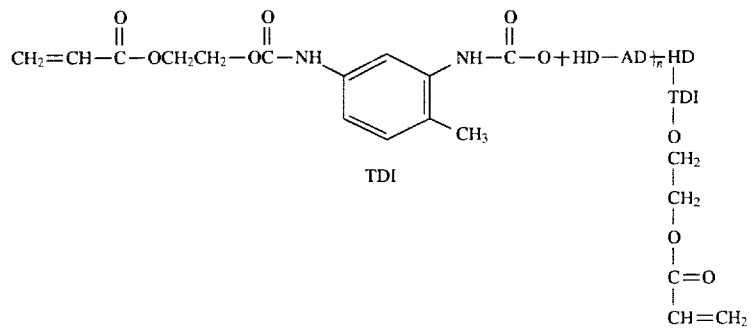

followed by further reaction with hydroxyethyl acrylate to give a possible structure of the form:

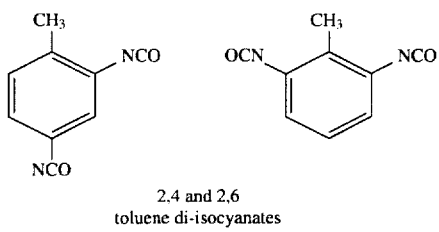

2,4 and 2,6 toluene di-isocyanates

Illustrative examples of other starting materials for synthesis of polyurethanes include optional di-isocyanates as shown in Table 1 and polyether polyols as shown in Table 2. The preceding overview of polyurethane chemistry is essentially that of Roffey, and is hereby incorporated by reference from *Photopolymerization of Surface Coatings*, C. G. Roffey, John Wiley & Sons: New York, pp. 153–156.

TABLE 1

Representative Di-isocyanates

| Name | Structure |
|---|---|
| PPDI | |
| TDI | |
| MDI | |
| PMDI | |
| NDI | |
| TODI | |
| XDI | |
| HDI | OCN(CH$_2$)$_6$NCO |
| TMDI | |

TABLE 1-continued

Representative Di-isocyanates

| Name | Structure |
|---|---|
| | 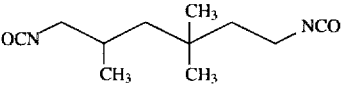 |
| CHDI | 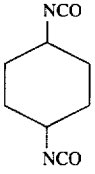 |
| BDI | 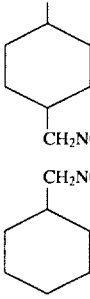 |
| H₆XDI | 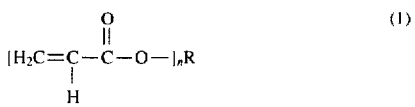 |

TABLE 2

Representative Polyether Polyols

| Product | Functionality |
|---|---|
| poly(ethylene glycol)(PEG) | 2 |
| poly(propylene glycol)(PPG) | 2 |
| PPG/PEG* | 2 |
| poly(tetramethylene glycol)(PTMG) | 2 |
| glycerol adduct | 3 |
| trimethylolpropane adduct | 3 |
| pentaerythritol adduct | 4 |
| ethylenediamine adduct | 4 |
| phenolic resin adduct | 4 |
| diethylenetriamine adduct | 5 |
| sorbitol adducts | 6 |
| sucrose adducts | 8 |

*Random or block copolymers.

The reactive monomers of the present invention are represented by the general formula (1):

$$[H_2C=C(H)-C(=O)-O-]_n R \quad (1)$$

Where "n" is an integer from 1 to 8, preferably from 2 to 6, and more preferably from 2 to 4; and "R" is an "n" functional hydrocarbon, an "n" functional substituted hydrocarbon, an "n" functional hydrocarbon containing at least one ether linkage, an "n" functional substituted hydrocarbon containing at least one ether linkage.

Preferred "n" functional hydrocarbons are the "n" functional aliphatic, preferably saturated aliphatic, hydrocarbons containing from 1 to about 20 carbon atoms and the "n" functional aromatic hydrocarbons containing from 6 to about 20 carbon atoms.

Preferred "n" functional hydrocarbons containing at least one ether linkage are the "n" functional aliphatic hydrocarbons, preferably saturated aliphatic hydrocarbon residues, containing from 1 to about 5 ether linkages and from 2 to about 20 carbon atoms.

Preferred "n" functional substituted hydrocarbons are the "n" functional aliphatic hydrocarbons, preferably the saturated aliphatic hydrocarbons, containing from 1 to about 20 carbon atoms, and the "n" functional aromatic hydrocarbons containing from 6 to about 10 carbon atoms which contain substituent groups such as the halogens, i.e., fluorine, chlorine, bromine and iodine, and/or substituent groups such as hydroxyl, —COOH, —COH and —COOR' groups wherein "R'" represents alkyl groups containing from 1 to about 6 carbon atoms.

Preferred "n" functional substituted hydrocarbons containing at least one ether linkage are the "n" functional aliphatic, preferably saturated aliphatic, hydrocarbons containing from 2 to about 20 carbon atoms and from 1 to about 5 ether linkages which contain substituent groups such as the halogen hydroxyl, —COOH, —COH, and —COOR' groups wherein "R'" is as defined above.

The more preferred polyfunctional acrylic monomers are those represented by Formula 1 wherein "R" is selected from the group consisting of an "n" functional saturated aliphatic hydrocarbon containing from 1 to about 20 carbon atoms, a hydroxyl substituted "n" functional saturated aliphatic hydrocarbon containing from about 1 to about 20 carbon atoms, an "n" functional saturated aliphatic hydrocarbon containing from 2 to about 20 carbon atoms and from 1 to about 5 ether linkages, and a hydroxyl substituted "n" functional saturated aliphatic hydrocarbon containing from 2 to about 20 carbon atoms and from 1 to about 5 ether linkages.

The preferred polyfunctional acrylate ester monomers are those wherein "R" is an "n" functional saturated aliphatic hydrocarbon, ether, or polyether, with those monomers wherein "R" is an "n" function saturated aliphatic hydrocarbon being more preferred.

More particularly, the di-functional acrylic monomers, or diacrylates, are represented by Formula 1 wherein "n" is 2; the trifunctional acrylic monomers, or triacrylates, are represented by Formula 1 wherein "n" is 3; and the tetrafunctional acrylic monomers, or tetra-acrylates, are represented by Formula 1 wherein "n" is 4. Illustrative of suitable polyfunctional acrylate ester monomers of Formula 1 are those listed below in Table 3.

These polyacrylate esters and their production are well known to those skilled in the art. The preceding is incorporated by reference from U.S. Pat. No. 4,198,465 by Moore, et al.

TABLE 3

Polyacrylates of Formula 1

1. CH₂=CHCOO—CH₂—OOCCH=CH₂
2. CH=CHCOO—CH₂—CH₂—OOCCH=CH₂

TABLE 3-continued

3. $CH_2=CHCOO-CH_2-CHOHCH_2-OOCCH=CH_2$
4. $CH_2=CHCOO-(CH_2)_4-OOCCH=CH_2$
5. $CH_2=CHCOO-CH_2-CH_2-CH-CH_2$
    $\phantom{CH_2=CHCOO-CH_2-CH_2-CH}|$
    $\phantom{CH_2=CHCOO-CH_2-CH_2-C}OOCCH=CH_2$
6. $CH_2=CHCOO-CH_2CH_2OCH_2CH_2-OOCCH=CH_2$
7. $CH_2=CHCOO-CH_2CH_2OCH_2CH_2OCH_2CH_2OCH_2CH_2-OOCCH=CH$
8. $CH_2=CHCOO-CH_2-\underset{\underset{CH_3}{|}}{\overset{\overset{CH_3}{|}}{C}}-OOCCH=CH_2$
9. $CH_2=CHCOO-CH_2-\underset{\underset{CH_3}{|}}{\overset{\overset{CH_2Br}{|}}{C}}-OOCCH=CH_2$
10. $CH_2=CHCOO-CH_2-\underset{\underset{CH_3}{|}}{\overset{\overset{CH_2OH}{|}}{C}}-OOCCH=CH_2$
11. $CH_2=CHCOO-CH_2-\underset{\underset{CH_2OH}{|}}{\overset{\overset{CH_2OH}{|}}{C}}-OOCCH=CH_2$
12. $CH_2=CHCOO-CH_2-\underset{\underset{CH_2Br}{|}}{\overset{\overset{CH_2OH}{|}}{C}}-OOCCH=CH_2$
13. $CH_2=CHCOO-CH_2-CH=CH-CH_2-CH_2-OOCCH=CH_2$
14. $CH_2=CHCOO-CH_2-CH=CH-CH-OOCH=CH_2$
    $\phantom{CH_2=CHCOO-CH_2-CH=CH-CH}|$
    $\phantom{CH_2=CHCOO-CH_2-CH=CH-C}CH_2OH$
15. $CH_2=CHCOO-CH_2-\underset{\underset{CH_2Cl}{|}}{\overset{\overset{CH_2OH}{|}}{C}}-CH_2-OOCCH=CH_2$
16. $CH_2=CHCOO-CH_2-\overset{\overset{OCH_3}{|}}{CH_2}-CH_2-OOCCH=CH_2$
17. $CH_2=CHCOO-\phenyl-OOCCH=CH_2$
18. $CH_2=CHCOO-\phenyl(CH_3)-OOCCH=CH_2$
19. $CH_2=CHCOO-\phenyl(Br)-OOCCH=CH_2$
20. $CH_2=CHCOO-\phenyl(OH)-OOCCH=CH_2$

TABLE 3-continued

21. 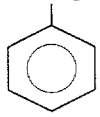

Triacrylates of Formula 1

22. 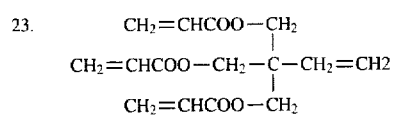

23. 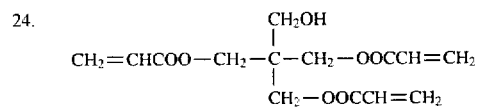

24. 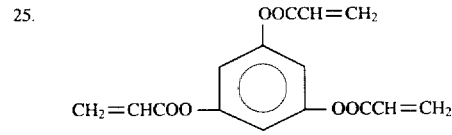

25. 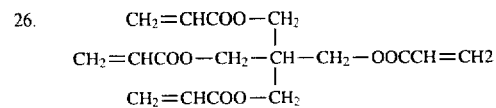

26. 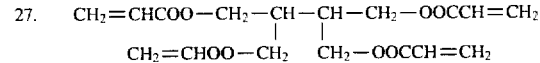

27. $CH_2=CHCOO-CH_2-CH-CH-CH_2-OOCCH=CH_2$
    $\quad\quad\quad\quad\quad\quad\quad\quad |\quad\quad |$
    $\quad\quad\quad\quad CH_2=CHOO-CH_2\quad CH_2-OOCCH=CH_2$ 28. 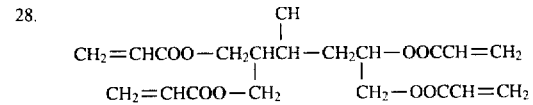

These polyacrylate esters and their production are well known to those skilled in the art. One method of producing the di-, tri-, and tetra-acrylate esters involves reacting acrylic acid with a di-, tri-, or tetrahydroxyl compound to produce the di-ester, tri-ester or tetra-ester. Thus, for example, acrylic acid can be reacted with ethylene glycol to produce ethylene glycol diacrylate (compound 2 in Table 3).

Although the coating compositions may contain only one of said polyfunctional acrylate monomers, coating compositions may contain a mixture of two polyfunctional monomers, preferably a diacrylate and a triacrylate. When the coating compositions contain a mixture of acrylate monomers, it is preferred that the ratio, by weight, of the diacrylate to the triacrylate be from about 30/70 to about 70/30. Exemplary mixtures of diacrylates and triacrylates include mixtures of hexanediol diacrylate with pentaerythritol triacrylate, hexanediol diacrylate with trimethylolpropane triacrylate, diethyleneglycol diacrylate with trimethylolpropane triacrylate.

While the corresponding coatings may likewise contain the ultraviolet light reaction product of a single polyfunctional acrylate monomer, coatings containing the photoreaction product of two polyfunctional acrylate monomers, preferably a diacrylate and a triacrylate, are preferred.

Generally, the coating composition contains from about 40 to about 99 weight percent of the polyfunctional acrylate or acrylates. The UV cured coating contains from about 40 to about 99 weight percent of the photoreaction products of the polyfunctional acrylate monomer or mixture of acrylate monomers present in the coating composition.

The photocurable coating compositions also contain a photosensitizing amount of photosensitizer, i.e., an amount effective to initiate the photocure of the coating composition. Generally, this amount is from about 0.01% to about 10% weight, preferably from about 0.1% to about 10% weight, and more preferably from about 0.1% to about 5% by weight of the photocurable coating composition. These additives and the cure thereof are generally well known in the art. Some non-limiting examples of these UV radiation photosensitizers include ketones, such as benzophenone, acetophenone, benzyl, benzyl methyl ketone, benzoins and substituted benzoins such as benzoin methyl ether, a-hydroxymethyl benzoin isopropyl ether; halogen-containing compounds such as a-bromoacetophenone, p-bromoacetophenone, and the like.

The coating compositions of the present invention may also optionally contain various flame retardants, flatting agents, surface active agents, thixotropic agents, UV light absorbers and dyes. All of these additives and the use thereof are well known in the art and do not require extensive discussions. Therefore, only a limited number will be referred to, it being understood that any compounds possessing the ability to function in such a manner, i.e., as a flame retardant, flatting agent, surface active agent, UV light absorber, and the like, can be used so long as they do not deleteriously affect the photocuring of the coating compositions.

The various surface-active agents, including anionic, cationic and nonionic surface-active agents are described in *Kirk-Othmer Encyclopedia of Chemical Technology,* Vol. 22, Interscience Publishers, New York, 1992, pp. 332–336 and 347–387—therefor, a reference incorporated herein.

DETAILED DESCRIPTION OF THE DRAWINGS

FIG. 1 shows an inflated passenger side airbag 1 deployed from a container in the dash and filling the area between the windshield/dash area of the vehicle and the occupant. The bag is of generally cylindrical shape and constructed of a large piece of fabric 21 with two panels of fabric 22 (one panel is shown in this schematic view) stitched to the ends of the large piece of fabric 21. The edges of fabric 21 and panels 22 are provided with the antiravel edge reinforcement as explained in more detail below and illustrated in more detail in FIG. 5.

Figure 2:
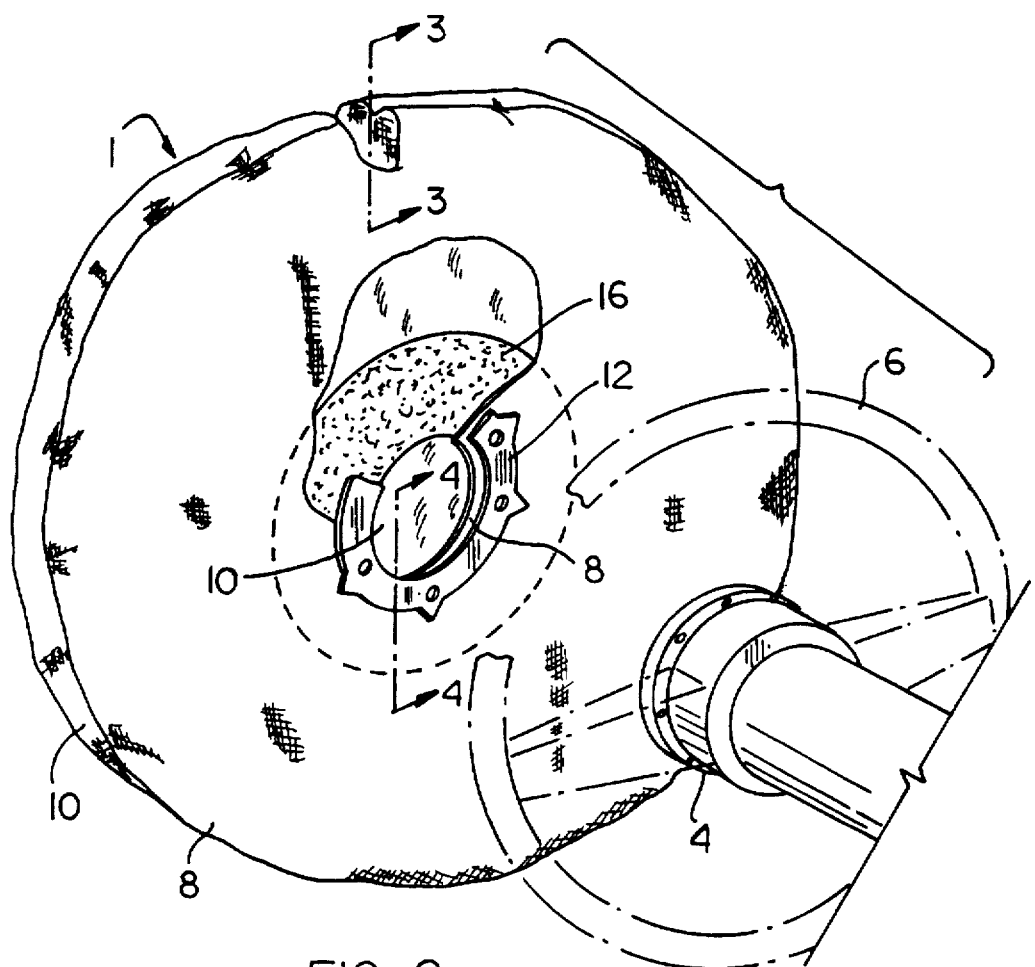
FIG. 2 illustrates an exploded perspective view of a driver side airbag from the steering wheel towards the inflated airbag with the airbag detached from the steering wheel.

FIG. 2 shows an inflated airbag 1 detached from the propellant canister 4 (for illustration purposes) and the steering wheel 6 shown in broken line. The airbag includes a rear panel 10, stitched together as shown in more detail as enlarged in FIG. 3. A broken-away section at the top reveals the cross-section 3—3 of FIG. 2.

The front panel 8 includes a central throat area suitably reinforced by reinforcement 12. A portion of the front panel 8 has been exploded to reveal the coating of the thin, abrasion resistant, flexible polymerized resin 16. Reinforcements 12 and 20 shown in FIGS. 2 and 4 serve as the means by which the front panel 8 of the airbag is attached to the propellant canister 4.

Figure 3:
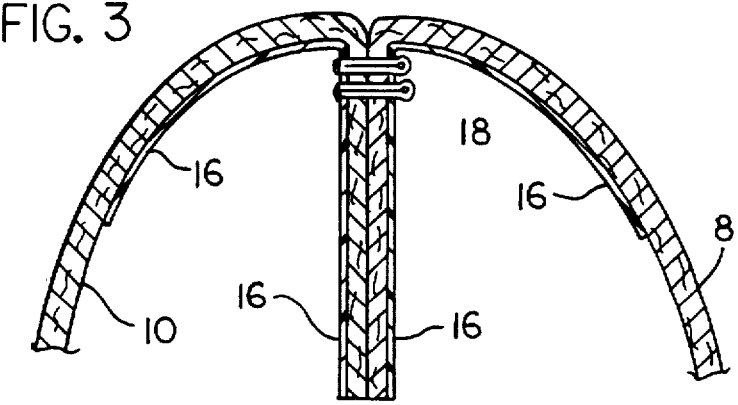
FIG. 3 illustrates an enlarged cross-sectional view taken along line 3—3 of FIG. 2 showing the two circular fabric pieces coated near their edges with the flexible thin film and stitched together.

FIG. 3 is a cross-section taken along line 3—3 of FIG. 2, and illustrates in greater detail the thin coating of flexible polymerized resin 16 and the two rows of stitching 18 around the circumference of the airbag joining the front panel 8 and rear panel 10 of the circular fabrics together.

Figure 4:
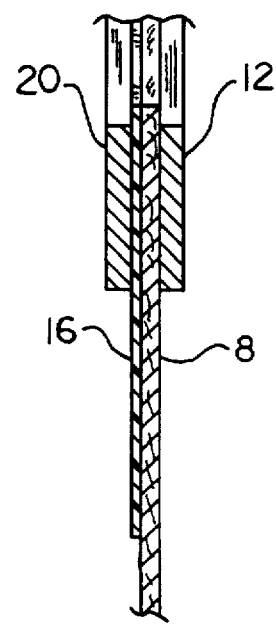
FIG. 4 illustrates an enlarged cross-sectional view taken along line 4—4 of FIG. 2 showing a detail of the reinforcing in the throat area.

FIG. 4 is a cross-section taken along line 4—4 of FIG. 2, and is enlarged to show the detail of the opposing throat reinforcements 12, 20 on the outside and inside, respectively, of the front panel 8 of the airbag with the flexible coating 16 applied to the inside of the front panel 8. It will be understood that the flexible coating may be applied to the outside of the front panel 8.

FIGS. 5–8 illustrate a generalized layout of a silk screen pattern for the application onto fabric of a radiation curable resin in pre-determined areas which define the required shapes. Pattern pieces or panels 24, 26, 29 and 31 in FIGS. 5, 6, 7, and 8, respectively, when cut out within the coated areas (shaded) 25, 27, 28, 30, and 32 and stitched together as directed in Example 1 form a typical passenger side airbag. Provision for attachment of the airbag to an inflation device is made by cutting out the section within the coated area 28 illustrated by but not restricted to the circular shape shown.

Figure 9:
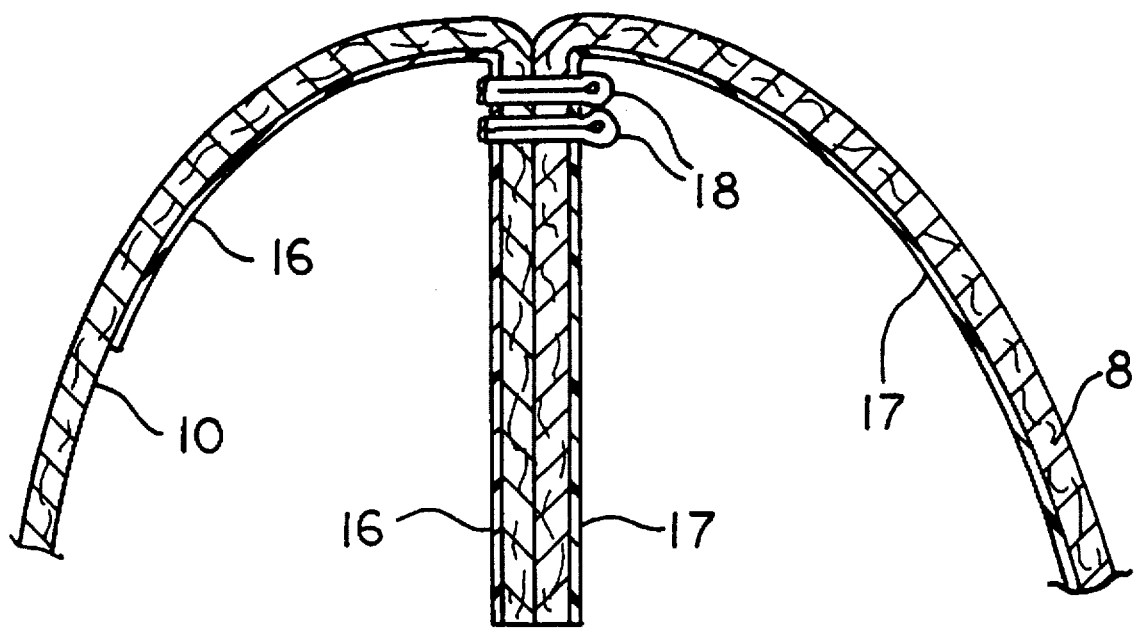
FIG. 9 illustrates an enlarged cross-sectional view of an alternative embodiment taken along line 3—3 of FIG. 2 showing two circular fabric pieces stitched together. One piece (or panel) of fabric is made of a breathable fabric which is coated near its edge with the thin, flexible polymerized film. The second piece (or panel) of fabric is made of a coated substantially non-breathable fabric.

FIG. 9 is a cross-sectional view of an alternative embodiment taken along line 3—3 of FIG. 2, and illustrates one panel being made of an uncoated, breathable fabric and having a coating of the thin, flexible polymerized resin 16 to prevent fabric raveling. A second panel is shown having substantially the same configuration as the first panel but is made of a coated, substantially non-breathable fabric 17.

By way of example, and not limitation, the following examples serve to further illustrate the present invention in its preferred embodiments.

EXAMPLE I

A first embodiment of the present invention includes the fabrication of an airbag made of a breathable woven or knit uncoated fabric. A typical driver's side airbag, when inflated, has an overall tablet, doughnut or circular pillow configuration. It is constructed of two circular or substantially circular pieces or panels of strong industrial fabric, typically nylon. The two circular pieces or panels are secured together around their periphery by stitching; then, the stitched article is turned inside out, placing the stitched seam on the inside of the bag. An opening, or throat, is provided on one of the two circular pieces or panels to attach the airbag to the inflation means. The throat perimeter is usually reinforced with an additional layer or layers of fabric, and the reinforced throat area is secured by fastening means such as screws and the like to the propellant canister.

The inflator is usually an azide pyrotechnic propellant, ignited by a fuse and triggered by an impending collision event. The propellant generates a pre-determined volume of non-toxic gas, such as nitrogen, which fills the confined space of the airbag, inflating it to the appropriately shaped configuration in a few milliseconds; then, the gas escapes from the bag, and it deflates rapidly to prevent rearward rebound of the passenger.

Within the airbag, there may be a means to confine the inflation in a direction away from the rush of the propellant and disperse the generated gas in a direction perpendicular to the gas flow or, in other words, to conform the inflated shape to a tablet or pillow and not a spherical balloon. Tethers (not shown) are typically used for this purpose and are secured to the interior of the bag from one of the circular panels to the other.

In the arrangement described above, which is illustrative but in no way intended to be limiting, three distinct areas require reinforcement: the perimeters of each of the circles to retain the stitching and the throat, as these are the cut edges that would otherwise ravel. In addition, a reinforcing coating is used on the areas of the circular panels to which the tethers are attached to prevent combout where the tethers are stitched and attached to the circular portions. However, the coating is not needed in this area to prevent raveling.

The fastening devices securing the throat area to the propellant canister may be apt to abrade the central face of the opposite fabric surface. Prior art constructions employ a circular fabric disk just larger than the opening provided for the canister stitched into the overlaying fabric to prevent such abrasion. The present invention includes a circular zone or variously shaped area of a flexible thin film of polymerized resin to accomplish the same objective but without the need for additional cutting, sewing and fabrication steps.

Figure 5:
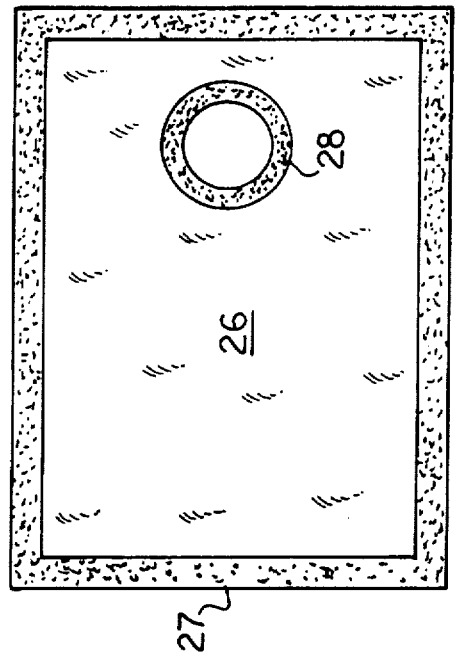
FIG. 5 illustrates a front panel of a generalized layout of a silk screen pattern for the application of coatings in defined areas that form panels from which airbags of various designs can be constructed.
Figure 7:
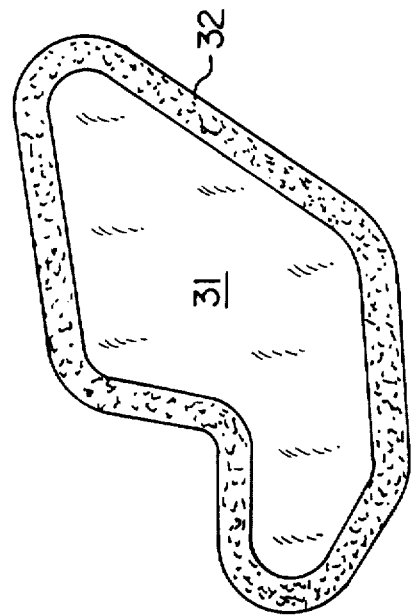
FIG. 7 illustrates a side panel of a generalized layout of a silk screen pattern for the application of coatings in defined areas that form panels from which airbags of various designs can be constructed.
Figure 6:
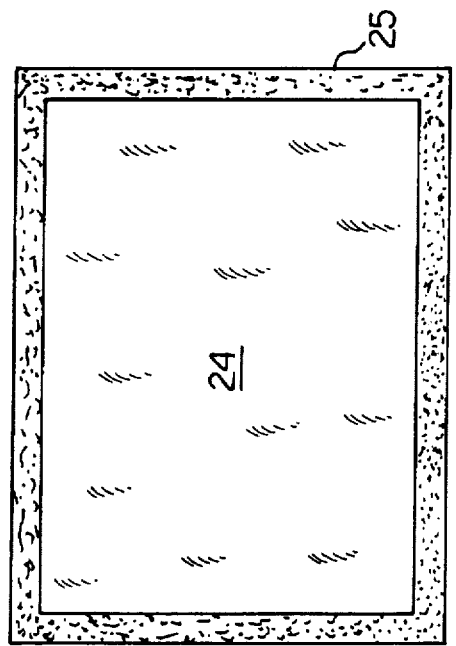
FIG. 6 illustrates a rear panel of a generalized layout of a silk screen pattern for the application of coatings in defined areas that form panels from which airbags of various designs can be constructed.
Figure 8:
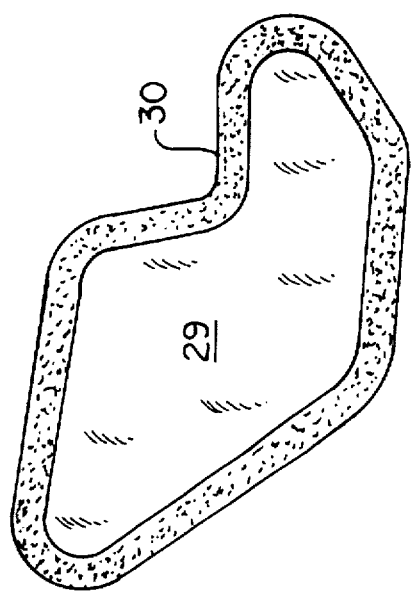
FIG. 8 illustrates a side panel of a generalized layout of a silk screen pattern for the application of coatings in defined areas that form panels from which airbags of various designs can be constructed.

In accordance with this aspect of the invention, the airbags of FIGS. 1 and 2 are constructed of a breathable, edge-coated fabric. The absence of a coating over the other portions of the fabric provides the required breathability. The edge coating as shown in detail in FIG. 3 prevents raveling along cut edges, notably the perimeter seam. The throat area and internal tethers may also be coated. The width of the treated area, as shown in FIG. 5 (27 etc.) is chosen to be sufficient to accommodate required cutting tolerances.

In another embodiment of the invention, airbag fabrics are rendered ravel-resistant by applying a thin, flexible polymerized coating at the edges thereof and in areas where combout, or abrasion, are likely to occur or where reinforcement is required. The process of this invention includes applying a liquid, radiation-curable resin system, in uncured or uncrosslinked form, pre-determined to selected areas of an airbag fabric in a pattern matching or approximating the areas and shapes of the fabric to be cut. Conveniently, the fabric is in open width.

Next, the applied resin system is exposed to the type of radiation needed to cure and crosslink the resin, depending upon the catalyst crosslinker, etc., system employed (see the following discussion), typically UV radiation. Once the liquid resin system is cured, it solidifies into a non-tacky coating and is preferably clear and transparent or substantially transparent.

Next, the airbag fabric is cut in the areas where the cured coating was applied. Cutting may be accomplished by any convenient means, including die punching or knife cutting. The area of the cut is aligned with or arranged to be within the coated area so as to leave a band or border of cured resin of sufficient width to prevent raveling of the non-selvage edge.

The cut pieces are then placed in the desired configuration and the airbag constructed typically by stitching within the reinforced area. The fabric is easily manipulated during construction and remains free of raveling. Once stitched, the seams are resistant to combout.

EXAMPLE II

Another objective of this invention is to provide a procedure for preventing the cut edge of an otherwise uncoated airbag fabric from raveling. The procedure is substantially carried out as previously explained in Example I. The general area of the airbag fabric that is to be cut is first selected, followed by application of a radiation-curable resin coating, and then curing and crosslinking the resin.

Coating formulations representative of those described herein are given in Tables 4 and 9. The compositions given in Table 4 are for a series of formulations whose performance is evaluated for their ability to strengthen the fabric edge by binding the warp and fill yarns together at the crossover points. Included are the formulations for eight compositions which differ in the relative amounts of mono- and di-functional reactive diluents and the addition of a polysiloxane copolymer surfactant.

The composition given in Table 9 must meet the additional requirement of passing flammability testing in accordance with Federal Motor Vehicle Safety Standard 302, and therefore includes both flame retarding additives and initiators as required to assure sufficient curing.

Test results for the formulations in Table 4 are shown in Tables 5–8. These tests are representative of those which are of importance in many coated fabric applications, including automotive airbags. The combout resistance data given in Table 5 is especially relevant to coatings applied for the purpose of ravel resistance. This data indicates a clear and dramatic increase in combout resistance, and hence, ravel resistance. The same is seen in Table 10, which reports similar testing for the flame retarded coating described in Table 9.

The effect on weight gain, thickness and flexibility are shown in Tables 6–8. All resulting values are well within the acceptable range for application of coated fabrics, including automotive airbags.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

TABLE 4

Coating Formulations

| COMPONENT | Formulation (Grams) | | | | | | | |
|---|---|---|---|---|---|---|---|---|
| | 1 | 2 | 3 | 4 | 5 | 6 | 7 | 8 |
| Acrylated aromatic urethane oligomer | 80 | 80 | 80 | 80 | 80 | 80 | 80 | 80 |
| Acrylated ester of tripropylene glycol | 10 | 10 | 10 | 10 | 20 | 20 | 20 | 20 |
| Acrylated ester of alkyl alcohol | 10 | 10 | 20 | 20 | 10 | 10 | 20 | 20 |
| Aromatic substituted propanol | 4.0 | 4.0 | 4.0 | 4.0 | 4.0 | 4.0 | 4.0 | 4.0 |
| Polyether modified dimethyl polysiloxane copolymer | 0 | 0.1 | 0 | 0.1 | 0 | 0.1 | 0 | 0.1 |

TABLE 5

Coated Fabric Combout[1]

| CONTROL[3] | FORMULATION[2] | | | | | | | |
|---|---|---|---|---|---|---|---|---|
| | 1 | 2 | 3 | 4 | 5 | 6 | 7 | 8 |
| 38.9 | 129.5 | 148.7 | 196.1 | 170.0 | 156.5 | 185.7 | 123.8 | 166.0 |

[1]The combout resistance test uses an instrumental tensiometer and special test fixture to comb yarns out of the woven fabric and measure the force required to do so. The test method and apparatus are described in "The Steger Tensile Test," Bobbin Magazine, June 1985, pp. 140–141.
[2]Correspond to formulations in Table 4, all coatings silkscreen applied through a mesh screen; cured with ultraviolet light source at 100 feet/minute.
[3]Control is uncoated 420 denier nylon fabric, Highland Industries Style #39010.

TABLE 6

Weight Gain by Coated Fabric (Oz. Sq. Yd.)

| FORMULATION | | | | | | | |
|---|---|---|---|---|---|---|---|
| 1 | 2 | 3 | 4 | 5 | 6 | 7 | 8 |
| 0.29 | 0.71 | 1.16 | 0.81 | 1.34 | 0.88 | 0.66 | 1.02 |

TABLE 7

| Thickness Increase by Coated Fabric (Inches) | | | | | | | |
|---|---|---|---|---|---|---|---|
| FORMULATION | | | | | | | |
| 1 | 2 | 3 | 4 | 5 | 6 | 7 | 8 |
| 0.0008 | 0.0004 | 0.0004 | 0.0002 | 0.0005 | 0.0002 | 0.0002 | 0.0002 |

TABLE 8

| Flexibility of Coated Fabrics (In. Deflection, Warp/Fill) | | | |
|---|---|---|---|
| FORMULATION | | | |
| 1 | 2 | 3 | 4 |
| .124/.478 | .333/.501 | .205/.667 | .580/.663 |
| 5 | 6 | 7 | 8 |
| .591/.438 | .676/.756 | .759/.708 | .737/.796 |

TABLE 9

Flame Retarded Coating Formulation

| COMPONENT | FORMULATION (grams) |
|---|---|
| Acrylated aliphatic urethane diacrylate (a) | 18.95 |
| Acrylated aliphatic urethane diacrylate (b) | 18.95 |
| Bromiated phthalate ester | 47.30 |
| Antimony trioxide | 5.30 |
| Aromatic ketone | 1.40 |
| Trialkylamine | 0.70 |

TABLE 10

Properties of Coated Fabric[1]

| TEST | RESULTS |
|---|---|
| Coated Fabric Combout Resistance (Lbf) | 166.5 |
| Weight Gain by Coated Fabric (Oz./Sq. Yd.) | 0.75 |
| Thickness Increase by Coated Fabric (Inch) | 0.0004 |
| Flexibility of Coated Fabric (Inch, Warp/Fill) | 0.233/0.301 |
| FMVSS.302 Flammability, Warp/Fill | SE/SE |

[1]420 denier nylon fabric Highland Industries, Style #32012

We claim:

1. A process of reinforcing airbag fabric to prevent raveling of yarns during cutting of the fabric, said process comprising the steps of:

(a) applying a thin layer of coating comprising a radiation-curable, resin and at least one flame retardant to a pre-selected area of airbag fabric to be cut, said radiation-curable resin being curable and crosslinkable at substantially ambient temperatures;

(b) irradiating the coated airbag fabric of step (a) in at least those areas containing the radiation-curable resin under conditions to cure and crosslink the resin into a thin, flexible, nonreactive coating impregnating the airbag fabric and securing the yarn crossovers together to prevent raveling and combout; and (c) cutting the irradiated airbag fabric in the coated areas into the pre-selected configuration, thereby producing a ravel-resistant edge.

2. The process of claim 1 including the step of sewing the cut fabric into the desired configuration.

3. The process of claim 1 in which the airbag fabric is coated with the radiation-curable resin and at least one flame retardant in patterns defining a plurality of shapes, irradiated, cut within the zones of irradiated resin, and sewn together to form an airbag.

4. The process of claim 1 in which the airbag fabric is uniformly coated on at least one of its entire surfaces with the radiation-curable resin and at least one flame retardant, irradiated, cut into at least two pieces and sewn together to form an airbag.

5. The process of claim 1, wherein the airbag fabric is woven or knitted.

6. The process of claim 3 to yield a first panel with a ravel-resistant edge and used in combination with at least one piece of fabric coated with a non-permeable coating of a thermosettable resin.

7. The process of claim 6, wherein the thermosettable resin is selected from the group of resins consisting of Neoprene rubbers and silicone rubber.

8. The process of claims 3, 4 or 6 in which one of the cut pieces includes a centrally located throat opening, also having a thin, flexible coating of reinforcing polymerized resin and at least one flame retardant thereon.

9. The process of claim 1 in which the airbag fabric is cut in step (c) with a die or a reciprocating knife.

10. An airbag fabric having at least one reinforced, ravel-resistant edge thereon produced by the process of claim 1.

11. An inflatable/deflatable airbag, comprising a first panel of breathable, substantially uncoated fabric having only around its periphery a coating of a thin, flexible polymerized resin and at least one flame retardant;

a second panel of a breathable, substantially uncoated fabric having only around its periphery a coating of a thin, flexible polymerized resin and at least one flame retardant, the second panel having substantially the same configuration as said first panel;

said first panel and second panels secured to each other with fastening means around their periphery and within said polymerized resin layers to form a closed, inflatable structure;

wherein one of said panels includes an opening for admitting a propellant for rapidly inflating the airbag and wherein said breathable airbag rapidly deflates after inflation.

12. The inflatable/deflatable airbag of claim 11 wherein the panel opposite the panel having the inflation opening has a coated area of an abrasion-resistant thin layer of thermoplastic or thermoset resin, the coated area corresponding substantially and located opposed to the inflation opening.

13. An inflatable/deflatable airbag, comprising at least one panel of breathable, substantially uncoated fabric having around its periphery a coating of a thin, flexible polymerized resin and at least one flame retardant;

at least one additional panel of a fabric coated with an air impervious thermosetting resin;

said panels secured together by stitching to form a closed, inflatable structure;

one of said panels including an opening for admitting a gaseous propellant for rapidly inflating the airbag, wherein said airbag deflates rapidly after inflation.

14. An inflatable/deflatable airbag, comprising a first panel and a second panel having substantially the same configuration as said first panel, one of said panels being a substantially uncoated, breathable fabric having only around its periphery a coating of a thin, flexible polymerized resin and at least one flame retardant to prevent fabric raveling and the other panel is made of a coated, substantially non-breathable fabric.

said first and second panels secured to teach other with fastening means around their periphery and within said polymerized resin layer to form a closed, inflatable structure, wherein one of said panels includes an opening for admitting a propellant for rapidly inflating the airbag and wherein said bag, upon impact, deflates rapidly after inflation.

15. A driver's side, passenger side, rear compartment or side airbag accordingly produced by the process of claims 3, 4 or 6.

16. A driver's side, passenger side, rear compartment or side airbag according to claims 11, 13 or 14.

17. The process of claim 1, wherein the flame retardant is a brominated phthalate ester.

18. The inflatable/deflatable airbag of claims 11, 13 or 14, wherein the flame retardant is a brominated phthalate ester.

* * * * *